United States Patent Office 3,325,626
Patented June 13, 1967

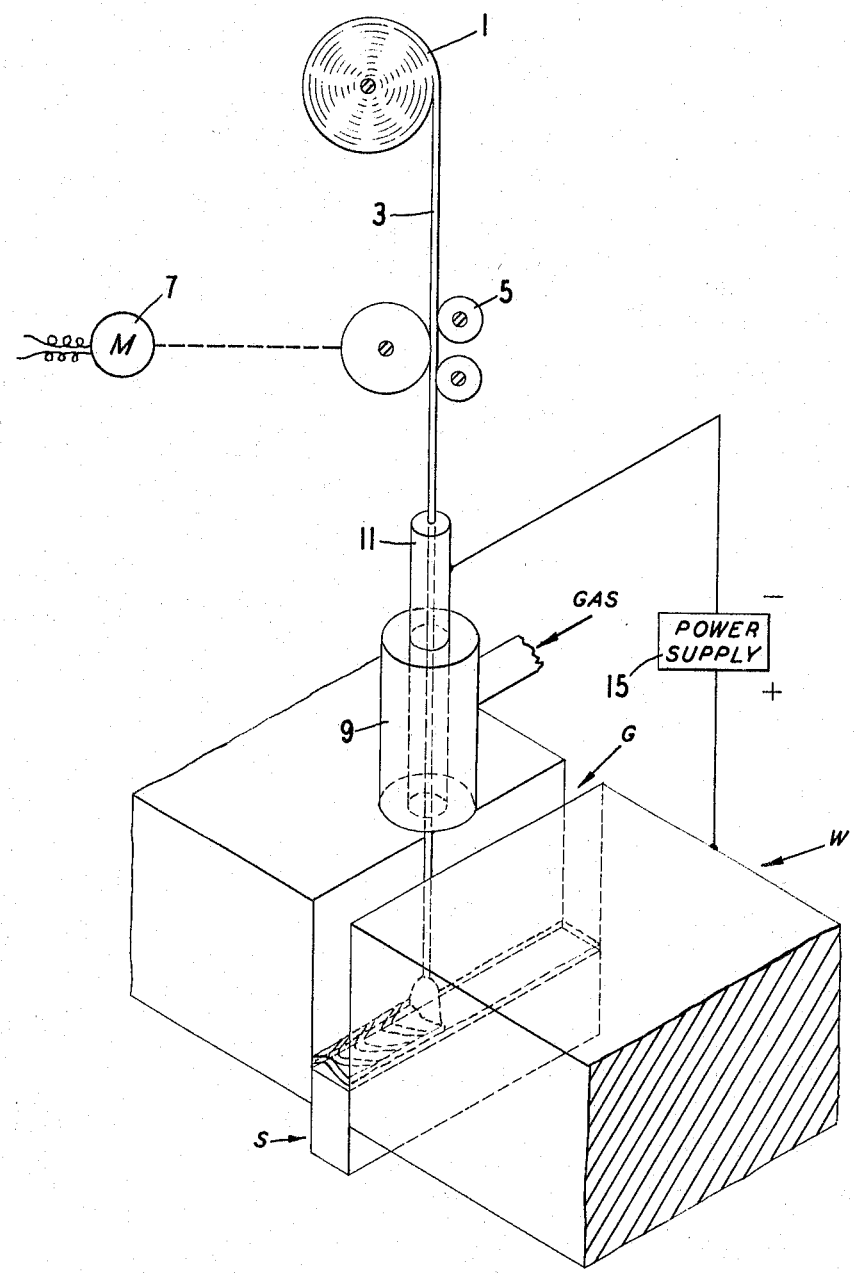

3,325,626
METHOD FOR WELDING IN A NARROW GROOVE
Herbert B. Sargent, Indianapolis, Ind., assignor to Union Carbide Corporation, a corporation of New York
Filed July 5, 1966, Ser. No. 562,739
8 Claims. (Cl. 219—137)

This invention relates to electric arc welding in a narrow groove. More particularly, this invention relates to gas-shielded consumable electrode arc welding in a narrow groove.

For purposes of this disclosure, the term "narrow groove" is used to define a joint wherein the thickness of the workpiece is at least 2 and up to 16 times the width of the groove between the faces of the work to be welded. Also included in the term "narrow groove" are circular joints falling within the above limits, such as, for example, holes in a workpiece which are to be filled with weld metal.

Industry has long been desirous of achieving a simple, economical process for welding comparatively thick plate having a thickness of greater than ½ in. with a narrow groove spacing between the faces of the plates to be welded.

The advantages of a commercially successful narrow groove process are almost self-evident. Such a process could eliminate the need for V or U joint designs which require excessive amounts of weld metal and time to deposit such weld metal. The prior art V and U joint designs promote warpage and distortion of the plates and increases the tendency for the weld metal to crack.

There have been attempts to make narrow groove welds in the past. However, all such attempts have been hampered by what are severe practical limitations. One such limitation is the tendency for spurious arcing to occur between the consumable electrode being fed down into the narrow groove and the side walls of the narrow groove. To overcome this problem the wire must be fed extremely straight so that the wire does not touch the walls. This is very difficult to achieve practically, especially with fine wires such as 0.045 in. diameter and smaller. Alternatively the wire, up until now, had to be fed through a current carrying contact which had to be insulated from the walls of the groove as the consumable electrode was fed therethrough.

Accordingly, it is the main object of this invention to provide a method for welding in a narrow groove with at least one consumable electrode fed into the groove with such wire being energized at a point at least 1.5 and up to 8 inches from the arcing end of the consumable electrode wire.

Another object is to provide a method for narrow groove welding wherein at least one consumable electrode is energized at a point at least 1.5 and up to about 8 inches from the arcing end of the consumable electrode, which electrode does not require insulation from the walls of the groove as it is fed thereinto.

Another object is to provide a method for filling holes in a workpiece with a consumable electrode fed thereto, such wire being energized before it enters the hole and which requires no insulation from the side walls of the hole.

A further object is to provide a process for welding in a narrow groove with at least one consumable electrode energized before it enters the groove with either straight or reversed polarity current.

A still further object is to provide such a process wherein a consumable electrode is fed continuously down into the groove at approximately the center plane therethrough.

Another object is to provide such a process wherein the consumable electrode is fed into the groove at approximately the center plane thereof through a contact tube that is substantially completely above the top of the groove.

Anoher object is to provide such a process wherein successive beads are deposited in the groove, one above another until the groove is filled.

Yet another object is to provide such a process wherein successive beads are deposited in the groove so that the beads overlap each other.

These and other objects will either be pointed out or will become apparent from the following description and drawing wherein the sole figure schematically shows typical apparatus for carrying out the invention.

The objects of the invention are accomplished in a general way by a method for making a weld in a groove wherein the width thereof is from about ¼ to about ⅝ of an inch and the depth thereof is at least 2 times the width which comprises feeding at least one electrode wire in the range of from about $3/32$ inch to about ¼ inch in diameter from a source thereof down into the groove without insulating said wire from the groove walls, establishing an arc between the end of such wire and the workpiece and introducing electrical energy into such wire at a point at least 1.5 and up to about 8 inches from the arcing end of the consumable electrode.

It has, unexpectedly, been found that when welding in a narrow groove, the bottom of the groove, being formed by a backing strip welded thereto, with electrode wires that range from about $3/32$ to about ¼ inch in diameter, that it is possible to use long wire extensions without the need for insulating the current carrying wire from the side walls of the groove. Wire extension is defined as being the length of wire between the point of current introduction and the arcing end of the wire and oftentimes is considered to be the same as the length of wire extending beyond the contact tube.

It has also been found that the presence of the groove walls in combination with wire extension affects the operation of the arc. It is postulated that the electromagnetic forces on the globule on the end of the consumable wire are lessened so that the globule falls into the puddle before it has grown as large as it would if the walls were not present. This lessens the spatter and broadens the heat distribution pattern.

Another important factor in the practice of the present invention is the consumable electrode wire diameter. Large wires permit current to flow through the long wire extensions without overheating the wire. Also, large wires can brush past any spatter that might accumulate on the groove walls or even touch the walls itself without interrupting the welding process, the part of the wire that touches the metal side walls melts off, but the remainder is thick enough to carry most of the current to the arcing end where such arc still exists.

Referring to the drawing, the workpiece W is prepared by providing a gap G of from about ¼ to about ⅝ of an inch between the faces to be welded. A backing strip S of material similar to the plate material is tack or fillet welded to the assembly below the groove. Usually if carbon dioxide is used as the shielding gas the strip is only tack welded to the plate. If helium or a lighter than air mixture is used, it is preferred to fillet weld the strip to the plate to more completely exclude air from the groove.

There is always a small narrowing of the groove width as successive passes weld deposits are placed on top of one another. To compensate for this contraction, the groove is usually made substantially parallel with a plus or minus 5 degree tolerance.

Suitable apparatus for practicing the invention includes a source of consumable electrode wire 1 from which wire 3 is fed through a wire straigthener 5 by wire feed motor 7. The wire 3 is fed to a nozzle assembly 9 having a contact tube 11 in positive electrical contact with the wire. Electrically hot wire emerges from the nozzle assembly 7 and is fed down into the groove without the need for any auxiliary insulating materials between the wire and the groove walls. The wire may be fed through the center plane of the groove or may be fed at an angle from the vertical, drawn in a cross-sectional plane, so as to direct the wire at the bottom corner of the groove. In this latter case, the weld is made by a series of overlapping fillet welds deposited one upon another as opposed to one weld deposited in the center of the groove. In the overlapping fillet technique, because of the angle at which the wire enters the groove, especially the smaller grooves in the range given, the contact tube may extend slightly into the groove at least for the first several passes. However, it is usually preferred to keep the contact tube out of the groove.

Shielding gas is passed down into the groove from the nozzle assembly 9. The shielding gas can be passed through a series of gas lens assemblies provided in the nozzle if desired. Gas lens of the type herein contemplated are described in U.S. Patent No. 3,053,968 and usually include a series of screens which have critically selected aperture sizes for providing a coherent stream of gas. The gas lens focuses the gas at the bottom of the groove and facilitates starting of the arc at those depths.

Electrical energy for the arc is provided from power source 15 between the wire 3 and workpiece W. The energy provided may be either straight polarity, that is the electrode wire is negative, or reverse polarity, that is the electrode wire is positive.

With reverse polarity good operation has been obtained with both carbon dioxide and helium as shielding gases. With straight polarity, carbon dioxide as well as mixtures of carbon dioxide with up to 90% helium worked well. Typical successful mixtures were 70% $CO_2$+30% He; 20% $CO_2$+80% He; and 10% $CO_2$+ 90% He.

As was mentioned previously, the wire diameter should be between about 3/32 inch and 1/4 inch. The major advantages of thick wires are that they can carry the required current through the long wire extensions without overheating the wire and that a thick wire can brush past spatter on the wall or even touch the wall without interrupting the welding process. This is not possible with wire much smaller than 3/32 of an inch.

The arc created at the end of the consumable wire should be short, preferably about 1/16 to about 1/8 inch long. The length should not be so short that all metal transfer is made during short-circuiting of the wire to the groove, but not so long that there is any tendency for the arc to climb the groove wall. Oscilloscope records show occasional short circuits, their frequency varying from one every few seconds to about 10 per second. Short circuiting apparently occurs whenever the globule happens to bridge the gap between the wire and work.

When the deposit is made by feeding the wire through the center plane of the groove, the bead should be filleted slightly into the wall and the surface should show freeze ripples that do not intersect to form a sharp line at the center of the groove. Increasing the voltage above about 38 volts increases the penetration and filleting into the wall, but at the same time sharpens the apex of the freeze ripples and, if carried too far, up to about 43 volts, causes hot cracking at the center plane, and under some conditions porosity in the deposit. Lowering the voltage to less than about 20 volts causes the freeze ripples to become more rounded and irregular and a hump to develop in the center of the groove, and decreases the penetration into the wall.

Because it is usually convenient to have the contact tube entirely above the top of the groove, it is preferred to use a set of conditions that allow the wire extension to be at least a little longer than the plate thickness. However, the best wire extension may be even greater than this, depending on the wire diameter, the polarity and the current desired. Increasing the wire extension tends to reduce the current, because of the increased resistance, and tends to broaden the penetration pattern. In most cases, the wire extension is held constant from one pass to the next, although in some cases it has been found that a weld could be made by letting the wire extension lessen as the deposit rises until a certain extension is reached and to maintain this extension until the weld is finished. Wire extensions of 1.5 to 8.0 inches have been used.

Welds have been made with currents from about 150 amperes up to about 750 amperes. The best welds have been made with 400–550 amperes using 1/8 and 3/16 inch wires. Welds have been made using 3/32 inch wires at currents as low as about 150 amperes. Currents higher than 550 amperes can be used with larger wires, i.e. 1/4 inch, especially with straight polarity.

It is preferred to have the wire enter the groove at a lagging angle of 15 degrees. The globule then usually forms at the rear of the wire as it moves through the groove and falls onto melted substrate. If the wire is vertical the orientation of the globule may change from one second to the next and sometimes fall ahead of the wire, where the substrate has not yet melted.

Table I lists typical conditions which have been used to successfully practice the process of the invention. These conditions are illustrative only and are not intended to limit the scope of the invention.

TABLE I.—CONDITIONS THAT HAVE BEEN USED TO MAKE SOUND WELDS

|  | 1 | 2 | 3 | 4 |
|---|---|---|---|---|
| Polarity | Straight (Electrode) (negative). | Reverse | Reverse | Reverse. |
| Groove Width | 1/2 | 3/8 | 3/8 | 3/8 in. |
| Wire Diameter | 1/8 | 1/8 | 1/8 | 3/16 in. |
| Filler Wire Type | Linde 65 [1] | Linde MI-88 [2] | Linde MI-88 [2] | Linde 81.[1] |
| Shielding Gas | 100% $CO_2$ or (0–90%) He+$CO_2$. | $CO_2$ | He | $CO_2$. |
| Wire Extension | 5.5 to 3.5 | 2.9 | 2.5 | 6.0 in. |
| Wire Feed Rate | 24 | 16.8 | 16.8 | 21.2 lb./hr. |
| Current | 400 (5.5" ext) 450 (3.5" ext). | 450 | 450 | 550 amp. |
| Voltage | 35.5 | 31.5 | 32.5 | 29 volts. |
| Travel Rate | 15 | 20 | 20 | 25 in./min. |
| Deposit Depth Per Pass. | 0.19 | 0.13 | 0.13 | 0.13 in. |

[1] Compositions are provided hereinafter.
[2] MI-88 is typically 0.04 C, 1.70 Ni, 1.60 Mn, 0.30 Si, 0.30 Mo.

Other examples of the invention are as follows:

Example I

A weld was made in a ¾ in. thick plate with a ¼ in. groove. The wire extension was 2½ inches with a 3/32 in. diameter 18% nickel wire. The current was 180 amperes reverse polarity at 26 volts. The shielding gas was 65% argon+35% helium. Wire feed rate was 9 lb./hr. Travel speed was 12 i.p.m.

Example II

In this example a weld was made in 2 in. thick plate with a ¼ in. groove. The wire extension was 3 inches with a 3/32 in. diameter wire known as Linde 65 having essentially the following composition: 0.04 C; 1.20 Mn; 0.50 Si; 0.10 Al; 0.07 Zr; 0.10 Ti. The current was 420 amperes. at about 28.5 volts reverse polarity. The shielding gas was 75% argon 25% $CO_2$. Wire feed rate was 26 lb./hr. Travel speed was 28 i.p.m.

Example III

A weld was made in 4 inch thick plate with a ½ inch groove. The wire extension was 3½ inches so that the contact tube extended slightly into the groove. The wire was directed at the corner of the groove so that wire formed a 3 deg. angle with the vertical axis of the groove in a plane drawn through the cross-section of the groove. The electrode was a 3/32 in. diameter wire known as Linde 81 having the following composition: 0.09 C; 1.00 Mn; 0.45 Si; 0.024 S; 0.017 P. The current was 530 amps at about 31.5 volts. The shielding gas was 75% argon+25% $CO_2$. Wire feed rate was 31 lb./hr. Travel speed was 30 i.p.m.

Example IV

Another weld was made in a 2 inch thick plate with a ¼ in. groove. The wire extension was 4½ inches with ⅛ in. diameter wire of the type specified in Example III. The current was 740 amperes reverse polarity at 32 volts. The shielding gas was 75% argon+25% $CO_2$. Wire feed rate was 47 lb./hr. Travel speed was 45 i.p.m.

Example V

A weld was made in ¾ in. thick plate with ¼ in. grooves. The wire extension was 2½ inches with 3/32 in. wire of the type specified in Example III. The current was 250 amp at 23½ volts reverse polarity. The shielding gas was 90% argon+10% helium. Wire feed rate 13 lb./hr. Travel speed was 14 i.p.m.

While the invention has been described with reference to certain preferred embodiments, it is to be understood that modifications may be made in techniques for carrying out the invention without departing from the spirit and scope thereof.

What is claimed is:

1. A method for making a weld in a workpiece having a groove wherein the width of the groove is from about ¼ to about ⅝ of an inch and the depth of the groove is at least 2 times the width, which comprises feeding at least one electrode wire in the range of from about 3/32 inch to about ¼ inch diameter from a source thereof down into the groove, establishing an arc between the end of such wire and the workpiece, introducing electrical energy into such wire at a point at least 1.5 and up to about 8 inches from the arcing end of the consumable electrode, and continuously feeding the electrically hot consumable electrode down into said groove without insulating said electrode wire from the groove at least between the point of such introduction of electrical energy into the wire electrode and the arcing end.

2. A method for making a weld in a workpiece having a groove wherein the width of the groove is from about ¼ to about ⅝ of an inch and the depth of the groove is at least 2 times the width, which comprises feeding at least one electrode wire in the range of from about 3/32 inch to about ¼ inch diameter from a source thereof down into the groove, establishing an arc between the end of such wire and the workpiece, introducing electrical energy into such wire before such wire enters said groove and continuously feeding the electrically hot consumable electrode down into the groove without insulating said electrode wire from the groove.

3. Process according to claim 1 wherein said arc is shielded by a gas taken from the class consisting of argon, helium, $CO_2$, mixtures of argon and helium, mixtures of $CO_2$ and argon, and mixtures of $CO_2$ and helium.

4. Process according to claim 3 wherein said shielding gas is passed through a gas lens assembly to focus the gas at the bottom of the groove.

5. Process according to claim 1 wherein a first pass is made by feeding the wire at an angle to the vertical, drawn in a cross-sectional plane, so as to direct the wire at the corner of the groove to make a fillet weld and then the second pass is made by overlapping a fillet weld on said first weld, this procedure being continued until the weld is completed.

6. Process according to claim 1 wherein the wire electrode is fed through the center plane of the groove.

7. Process according to claim 6 wherein the wire enters the groove at a lagging angle of 15 degrees.

8. A method of making a weld in a workpiece having a groove wherein the width of the groove is from about ¼ to about ⅝ of an inch and the depth of the groove is at least 2 times the width, which comprises: positioning a contact tube above the workpiece; feeding an electrode wire in the range of from about 3/32 inch to about ¼ inch diameter, from a source thereof, through said contact tube while making electrical contact therewith down into the groove; establishing an arc between the end of said wire and the workpiece; passing a current through said contact tube into said wire at a point at least 1.5 and up to about 8 inches from the arcing end of said wire, said current having a magnitude in the range of from 150 to 750 amperes at a voltage from 20 to 43 volts.

References Cited

UNITED STATES PATENTS 2,868,951    1/1959    Shrubsall _____ 219—74

RICHARD M. WOOD, *Primary Examiner.*